US008833014B2

(12) United States Patent  (10) Patent No.: US 8,833,014 B2
Beele  (45) Date of Patent: Sep. 16, 2014

(54) SYSTEM FOR DYNAMICALLY SEALING AT LEAST ONE CONDUIT THROUGH WHICH A PIPE OR CABLE EXTENDS

(71) Applicant: Beele Engineering B.V., Aalten (NL)

(72) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 0 days.

(21) Appl. No.: 13/772,148

(22) Filed: Feb. 20, 2013

(65) Prior Publication Data

US 2013/0161913 A1 Jun. 27, 2013

Related U.S. Application Data

(63) Continuation of application No. 12/310,375, filed as application No. PCT/EP2007/058814 on Aug. 24, 2007, now Pat. No. 8,490,353.

(30) Foreign Application Priority Data

Aug. 25, 2006 (EP) .................................. 06017773

(51) Int. Cl.
E04C 2/52 (2006.01)
H02G 3/00 (2006.01)
F16L 5/10 (2006.01)
H02G 3/22 (2006.01)
F16L 5/14 (2006.01)

(52) U.S. Cl.
CPC . *H02G 3/22* (2013.01); *H02G 3/26* (2013.01); *F16L 5/10* (2013.01); *F16L 5/14* (2013.01)
USPC .......... 52/220.8; 277/607; 277/608; 277/615; 285/124.5

(58) Field of Classification Search
USPC ......... 52/220.8; 277/606, 607, 608, 609, 615, 277/644; 248/49, 68.1; 285/124.1–124.5, 285/189–222; 174/74 R, 76–83, 84 R, 88 R, 174/89–93
See application file for complete search history.

(56) References Cited

U.S. PATENT DOCUMENTS 2,032,492 A    3/1936  Nathan
2,202,617 A *  5/1940  Bishop ............................ 156/51

(Continued)

FOREIGN PATENT DOCUMENTS

CA    2 325 183        5/2001
DE    3443284 A1       5/1986

(Continued)

OTHER PUBLICATIONS

English translation of the Description and Claims for Application No. FR2169219.

(Continued)

*Primary Examiner* — Robert Canfield
*Assistant Examiner* — Babajide Demuren
(74) *Attorney, Agent, or Firm* — Wolf, Greenfield & Sacks, P.C.

(57) ABSTRACT

A system for providing a sealed transit for a situation wherein one or a plurality of cables, pipes or ducts (2) extend through the transit, wherein the system comprises a frame (100) which is sealingly fixed or fixable into or onto an opening, wherein the frame (100) comprises one or a plurality of conduits (203) which are each suitable for receiving at least one of the plurality of cables, pipes or ducts (2) and for receiving an elastically deformable plug (4) for sealingly filling space between an inner circumferential wall of the conduits (203) and at least one of the plurality of cables, pipes or ducts (2), when the system further comprises at least one blocking element (37) for hindering in each conduit (203) movement of one end of a plug (4) which is inserted in that conduit (203).

14 Claims, 13 Drawing Sheets

(56) References Cited

U.S. PATENT DOCUMENTS

| | | | |
|---|---|---|---|
| 2,271,777 A | 2/1942 | Nathan | |
| 2,448,769 A | 9/1948 | Chamberlain | |
| 2,819,099 A | 1/1958 | Rittle | |
| 3,048,415 A | 8/1962 | Shook | |
| 3,067,425 A | 12/1962 | Colley | |
| 3,163,448 A * | 12/1964 | Carl | 277/612 |
| 3,331,914 A | 7/1967 | Kavinsky | |
| 3,352,212 A | 11/1967 | Read | |
| 3,578,027 A | 5/1971 | Zopfi | |
| 3,702,193 A | 11/1972 | Flegel et al. | |
| 3,731,448 A | 5/1973 | Leo | |
| 3,793,672 A | 2/1974 | Wetmore | |
| 3,811,711 A | 5/1974 | Tarkenton | |
| 3,827,704 A | 8/1974 | Gillemot et al. | |
| 3,893,919 A | 7/1975 | Flegel et al. | |
| 3,913,928 A | 10/1975 | Yamaguchi | |
| 4,075,803 A | 2/1978 | Alesi, Jr. | |
| 4,086,736 A * | 5/1978 | Landrigan | 52/220.8 |
| 4,293,138 A | 10/1981 | Swantee | |
| 4,385,777 A | 5/1983 | Logsdon | |
| 4,426,095 A | 1/1984 | Buttner | |
| 4,429,886 A | 2/1984 | Buttner | |
| 4,641,858 A | 2/1987 | Roux | |
| 4,797,122 A | 1/1989 | Kuboi et al. | |
| 4,998,896 A | 3/1991 | Lundergan | |
| 5,344,106 A | 9/1994 | Beele | |
| 5,456,050 A * | 10/1995 | Ward | 52/220.8 |
| 5,653,452 A | 8/1997 | Jarvenkyla | |
| 5,662,336 A | 9/1997 | Hayashi | |
| 5,927,725 A | 7/1999 | Tabata et al. | |
| 6,494,463 B1 | 12/2002 | Rank | |
| 6,575,430 B1 | 6/2003 | Smith | |
| 6,862,852 B1 | 3/2005 | Beele | |
| 6,969,799 B2 * | 11/2005 | Snyder | 174/483 |
| 7,299,823 B2 * | 11/2007 | Smith | 137/597 |
| 7,802,798 B2 | 9/2010 | Beele | |
| 8,490,353 B2 | 7/2013 | Beele | |
| 2002/0171207 A1 | 11/2002 | Torii | |
| 2004/0045233 A1 | 3/2004 | Beele | |
| 2004/0168398 A1 * | 9/2004 | Sakno et al. | 52/741.4 |
| 2008/0088128 A1 * | 4/2008 | Staskal | 285/230 |
| 2010/0059941 A1 | 3/2010 | Beele | |

FOREIGN PATENT DOCUMENTS

| | | |
|---|---|---|
| DE | 9204067 | 3/1992 |
| DE | 9206312 | 8/1992 |
| DE | 42 25 916 A1 | 2/1994 |
| DE | 296 05 883 | 7/1996 |
| DE | 20002216 U1 | 4/2000 |
| DE | 10035006 C1 | 7/2000 |
| DE | 202004017185 U1 | 3/2006 |
| EP | 0 102 876 A2 | 3/1984 |
| EP | 0 139 337 A2 | 5/1985 |
| EP | 0 278 544 A1 | 8/1988 |
| EP | 0 987 482 | 3/2000 |
| EP | 1 022 834 A1 | 7/2000 |
| EP | 1 059 695 | 12/2000 |
| EP | 1 101 992 | 5/2001 |
| EP | 1 134472 | 9/2001 |
| EP | 1 837 573 A1 | 9/2007 |
| FR | 2169219 | 9/1973 |
| FR | 2 675 879 | 10/1992 |
| GB | 916 461 | 1/1963 |
| GB | 2 057 595 | 4/1981 |
| GB | 2 186 442 A | 8/1987 |
| GB | 2 221 736 | 2/1990 |
| JP | H5-41868 B | 6/1993 |
| JP | H6-93372 | 4/1994 |
| JP | H7-282894 | 10/1995 |
| JP | 2006-514249 | 4/2006 |
| WO | WO 02/052187 | 7/2002 |
| WO | WO 2004/111513 | 12/2004 |

OTHER PUBLICATIONS

International Search Report for International Application No. PCT/EP2007/058814, dated Dec. 4, 2007.
International Preliminary Report for International Application No. PCT/EP2007/058814, dated Aug. 14, 2008.
European Search Report dated Apr. 19, 2013 for EP 13 15 1613 (2 pages).
International Search Report mailed Jun. 29, 2007 for PCT/EP2007/002478 (4 pages).
International Preliminary Report on Patentability dated Jul. 1, 2008 for PCT/EP2007/002478 (8 pages).

* cited by examiner

SYSTEM FOR DYNAMICALLY SEALING AT LEAST ONE CONDUIT THROUGH WHICH A PIPE OR CABLE EXTENDS

RELATED APPLICATIONS

This application is a continuation of U.S. application Ser. No. 12/310,375, entitled "SYSTEM FOR DYNAMICALLY SEALING AT LEAST ONE CONDUIT THROUGH WHICH A PIPE OR CABLE EXTENDS," now U.S. Pat. No. 8,490,353, which is a National Stage Entry of PCT/EP2007/058814, filed Aug. 24, 2007, which claims the benefit under 35 U.S.C. § 119(a)-(d) of European application number 06017773.0, filed Aug. 25, 2006.

The invention relates to a system for providing a sealed transit for a situation wherein one or a plurality of cables, pipes or ducts extend through the transit.

The invention further relates to a system for sealing an opening through which at least one pipe; cable or duct extends via a conduit sleeve which is fittingly and sealingly fixed to a circumference of the opening or which corresponds to the opening.

Such an opening may comprises a tubular passage in a floor, deck, wall or partition. Another possibility is that the opening comprises a tube in which another tube is at least partly received.

Such a system is used for, for instance, two tubes having mutually different diameters connected with each other so that a fluid can flow through both tubes. One of the tubes may, for instance, form a house service connection and have a smaller diameter than a tube which forms the main line or is a branch thereof. Such tubes may be used for, for instance, transporting water, gas, oils, liquid, chemicals etc. The space located between the tubes is meant to be sealed by a system to which the invention relates.

It is also possible that cables for, for instance, telephone, electricity, and television are fed through such tubes connected with one another. Another possibility is using the system as a seal between glass fiber cables and protective tubes. Such a system may also be used for walls of buildings, in particular foundation walls and floors but also ceilings or roofs where, by means of "lost plastic tube parts", passages are left open in the poured concrete for feeding through tubes for water or gas or cables. Of course, the passage may also be provided in a concrete base with the aid of a boring method. The space between the duct and the inner wall of the "lost tube part" or the bore hole may later be sealed with a system to which the invention relates.

Further, a system to which the invention relates can be used in the construction and/or maintenance of new buildings, ships and offshore installations. Sections in such constructions are usually formed by placing prefabricated partitions according to a predetermined plan, in the case of vessels, in a dock of the shipyard. Even before the partitions are placed, feed-through tubes can be provided in the partitions, for instance with the aid of a welding method. Such a feed-through tube may be a conduit sleeve as referred to above. After the duct is fed through the feed-through tube, a system to which the invention relates can be provided for sealing a space between the inner wall of the feed-through tube and the fed-through duct. It is further possible that the feed-through tube and the duct, cable or tube fed through it are manufactured from different metal-comprising materials. This is possible because there will be no contact between the feed-through tube and the duct, cable or tube fed through it so that galvanic corrosion is at least virtually precluded.

The space between the inner wall of the conduit sleeve and at least one tube or duct is herein below often simply referred to as "the space".

GB 2186442 describes a transit system for cables and pipes. The system comprises a metal frame having an opening filled with lead-through blocks and blanking blocks. The lead-through blocks comprise two half-blocks which can together form a block having an opening through which a pipe, cable or duct can be fed. In other words, two halves of the lead-through blocks can surround a pipe, cable or duct. Each pipe, cable or duct is thus surrounded by at least two blocks. The remaining space in the opening is filled up with blank blocks. In this way the space between the inner wall of the conduit sleeve, in this case a metal frame, and the pipes, ducts or cables extending through the conduit sleeve or metal frame is filled up with blocks. It is possible that a stay plate is positioned between each layer of blocks. Pressure is then applied to the assembled blocks to compress the blocks around the cable, pipe or duct to seal the lead-through blocks around the cable, pipe or duct and to clamp them together and against the side walls of the frame or the conduit sleeve and to the stay plate. For this purpose, the system comprises a compression and packer system. Pressure can be applied by a system that requires tightening of nuts or compression bolts. The forces needed for compression are very high and partly passed on to the ducted pipe or cable, often non-hydrostatically. This system cannot distribute the load evenly throughout the stacking of blocks. In fact, the ducted pipe or cable will carry a part of the load and prevent an even distribution. The blocks which are much less subjected to compression "in the shade of the ducted pipe or duct" can easily be forced out. Another problem is the irreversible deformation of the rubber, which reduces the flexibility of the transit system which can be detrimental when a part of the system is suddenly exposed to a much higher pressure.

Apart from the fact that the system is difficult to install, time-consuming, costly, and requiring a large inventory control, the system further works unsatisfactorily in the long-run. Rubber, even well vulcanised rubber, has a natural relaxation occurring over time. When the rubber has not properly been saturated or vulcanised, also chemical relaxation can occur. This enhances the overall relaxation of the rubber. As a consequence of this, compression bolts or nuts of the compression and packer system of the system described in GB 2186442, needs to be retightened frequently. A further problem is that a change in temperature will due to thermal expansion or shrinkage result in loosening or over-tightening of the compression bolts, resulting in respectively weakening the sealing and irreversible deformation of the rubber.

In particular when plastic pipes or cables with plastic braidings extend through the metal frame or conduit sleeve, the outer surface of these tubes or cables is subjected to radial inward pressure and the outer diameter of these plastic pipes may decrease due to a phenomenon known as "creep". If this occurs, compression bolts and nuts of the compression and packer system should be retightened even more frequently as the integrity of the sealing provided by the compressed rubber blocks and the radially compressed plastic pipes, diminishes by both physical phenomena, creep and relaxation. However, no matter how frequently the compression bolts and/or nuts are retightened, immediately after retightening, the phenomena of relaxation of the rubber and creep of a plastic pipe will continue to occur so that the integrity of the sealing immediately further deteriorates.

Thunderhorse, the largest and most advanced semi-submersible platform in the world, was found to have a list of some 20-30 degrees after experiencing hurricane "Dennis" in the Gulf of Mexico. Although as yet no conclusive explanation for this listing has been reported, preliminary findings from the investigation indicate that water movement among the access spaces occurred through multi-cable transits which were equipped with a system similar to that GB 2186442.

Known are systems where a rubber ring is coaxially placed in a conduit sleeve around a pipe ducted through the conduit. The rubber ring is then compressed between steel ring shaped plates. Although this leads to the building up of radial forces angularly equally applied, the problems of relaxation of the rubber and, in case of plastic pipes, the problems of creep, requires frequent retightening of the compressing steel plates.

WO 2004/111513 describes a system, in more detail a plug, made of an elastically formable material for insertion in a space between an inner wall of a conduit sleeve, and a pipe, cable or duct extending through that sleeve. The plug may comprise two segmental longitudinal parts for forming a sealing plug which can be received in the space. The longitudinal parts are each provided with an outside which comprises a number of outer ribs spaced apart in a longitudinal direction for realizing, in use, annular contact surfaces which are each closed in itself in a circumferential direction between the sealing plug and the inner wall of the opening. Each of the longitudinal parts is further provided on the inside with a number of inner ribs for realizing, in use, annular contact surfaces which are each closed in itself in a circumferential direction between the sealing plug and the pipe, cable or duct extending through the opening. Each of the longitudinal parts is further provided with an outer collar intended to be placed against an outer edge of the opening. When the plug is assembled these collars are part of a flange which is such that forces can be exerted onto the flange for inserting the longitudinal parts. The flange is designed such that it can be placed against the outer edge of the opening. The outer edge of the opening is thus covered by the flange. The flange further ensures equal insertion, so that the outer ribs of the longitudinal parts are lined up to form the annular contact surfaces and such that the inner ribs are lined up to form the annular contact surfaces.

An advantage of this sealing system is that it is very easy to insert, and after applying grease to the longitudinal parts, manual insertion may even be possible. A further advantage is that it is highly unlikely that the plug will be further pushed into the conduit sleeve or opening, even not when a very high pressure is applied to the flange. It has turned out that this sealing system retains its sealing integrity also when a very high pressure is applied to the side of the plug that is first inserted into the opening or conduit sleeve. Only after application of a very high pressure on that end of the plug, the plug may be forced out of the conduit sleeve or opening. Another advantage is that the ribs provide some flexibility in the sealing system, so that no retightening is needed. When the rubber relaxes, the ribs are still providing annular contact surfaces and thus a sealing remains intact. This response also applies to the unlikely occurrence of creep which would result in a smaller diameter of a plastic pipe extending through the opening or conduit sleeve. However, as indicated, the creep itself is already unlikely to occur, as the actual radial load applied to a plastic pipe extending through the conduit sleeve will, due to the relaxation of the rubber, decrease in time, so that the possible occurrence of creep will come to a slowdown rather than an acceleration.

Although the system described in WO 2004/111513 A1 works satisfactorily, there remains a need for sealing systems that can sustain a sudden increase of a pressure applied to one end of the sealing system.

It is a first objective of one embodiment of the invention to meet this need.

It is a second objective of one embodiment of the invention to provide a system which meets the first objective and which is suitable for providing a sealed transit for a situation wherein one or a plurality of cables, pipes, or ducts extend through the transit.

The first objective of the invention is achieved by providing a system for dynamically sealing an opening through which at least one pipe, cable or duct extends by a conduit sleeve which is fittingly and sealingly fixed to a circumference of the opening or which corresponds with the opening. The system comprises of at least an elastically deformable plug which is fittingly and sealingly insertable in the conduit sleeve. The plug has two ends, an outer side and an inner side. Each end has dimensions that allow for fitting of that end in the conduit sleeve, the outer side comprises a number of outer ribs having tops spaced apart in the longitudinal direction of the plug for realizing annular contact surfaces between the plug and the inner circumferential wall of the conduit sleeve. The inner side comprises a number of inner ribs having the tops spaced apart in the longitudinal direction of the plug for realizing annular contact surfaces between the plug and the at least one pipe, cable or duct. The inner side and/or the outside is provided with at least one hingeble surface area for facilitating compression of the plug in the longitudinal direction and a transverse movement of at least one of the inner or outer ribs.

As each of the ends have dimensions that allow for fitting of that end in the conduit sleeve, the plug can in its entirety be inserted into the sleeve. When at one of the ends of the plug a very high pressure is applied, that end will initially be pressed towards the other end. The hingeable surface area will facilitate the compression of the plug in the longitudinal direction. The transverse movement of at least one of the inner or outer ribs ensures that the sealing is actually improved when the compression occurs. When a high pressure is applied on one end of the sealing plug, the sealing tightens itself thus further in the space between the inner wall of the conduit and the pipe, cable or duct that extends through the conduit sleeve. In other words, the sealing starts acting dynamically.

It is to be noted that the system does not constantly apply a very high pressure on a plastic pipe that extends via the conduit sleeve through the opening. A very high radial pressure occurs only when a high pressure is applied to one of the ends of the plug. Consequently, the occurrence of creep of the plastic pipe, is unlikely to occur to a large extent.

In an embodiment of a system according to the invention, the hingeable surface is provided by two adjacent sloped surfaces of two adjacent ribs. In such an embodiment it is facilitated that at least two ribs move in a transverse direction when the plug is being compressed in the longitudinal direction. Furthermore, there can be a high number of ribs for a longitudinal length. It is possible that between each set of two adjacent ribs, a hingeable surface is provided. In other words, the longitudinal length of the plug is very efficiently used. This enhances the overall sealing capacity after insertion without the application of a pressure wave to one end of the plug, and even more so, when a pressure wave is applied to one end of the plug.

An embodiment of a system according to the invention further comprises a blocking element for hindering, when in use, an external pressure gradient is present between both ends of the plug, movement of the downstream end of the plug downstream the pressure gradient. This not only ensures that equal insertion can occur, leading to lining up of ribs so that the annular contact surfaces are correctly formed, it also ensures that the plug will be compressed rather than moved in its entirety in the conduit sleeve downstream the external pressure gradient. This further facilitates the improvement of the sealing capacity. Such a system may withstand a shock wave due to, for instance, a sudden sinking down in the water, an explosion, hurricane or perhaps even a tsunami. Experiments have indicated that the plug will retain its sealing integrity when the pressure difference between both ends of the plug is up to 15 bar (which is a pressure present at 150 meters below water surface).

This applies in particular for an embodiment of a system according to the invention wherein two plugs as described above are situated in the conduit sleeve and a blocking element is situated between these two plugs. In this case the system will dynamically seal independent of the direction of the external pressure gradient. In either situation, one of the plugs will be compressed, thus increasing its sealing contact surfaces and applying a higher load normal to these contact surfaces so that the sealing overall greatly improves.

Also an embodiment of a system according to the invention wherein at least two blocking elements are applied for hindering, in use, relative to the conduit simultaneous and equal movement of both ends of the plug downstream an external pressure gradient, has these advantages. Independent of the direction of the pressure gradient, the plug will always compress and improve its sealing role.

The invention further relates to a transit system comprising a plug as described above and a conduit sleeve.

The invention is further related to a method for sealing a space in a conduit sleeve between an inner wall of the conduit sleeve and at least one pipe, tube or duct, which extends through the conduit sleeve.

The second objective is achieved by the subject matter of independent claim 1.

The invention is now elucidated by describing a non-limiting example with the aid of a drawing. In the drawing.

In the drawings, like parts have like references.

Figure 1:
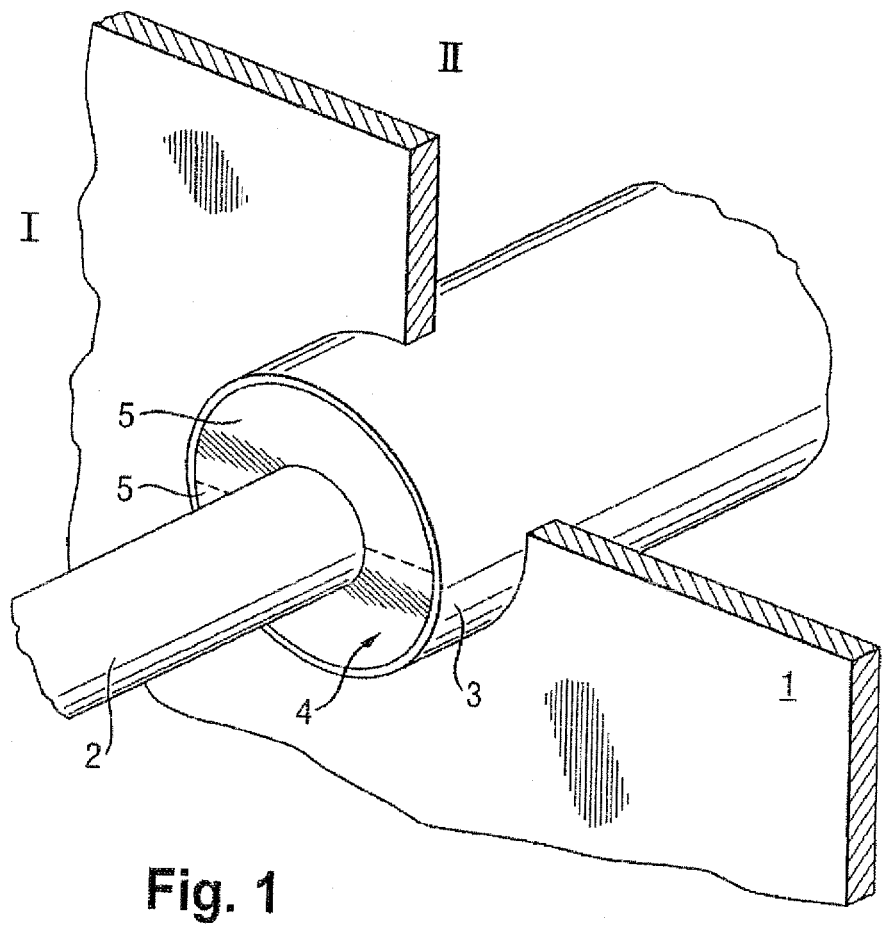
FIG. 1 shows schematically in perspective an embodiment of a system according to the invention.
Figure 2:
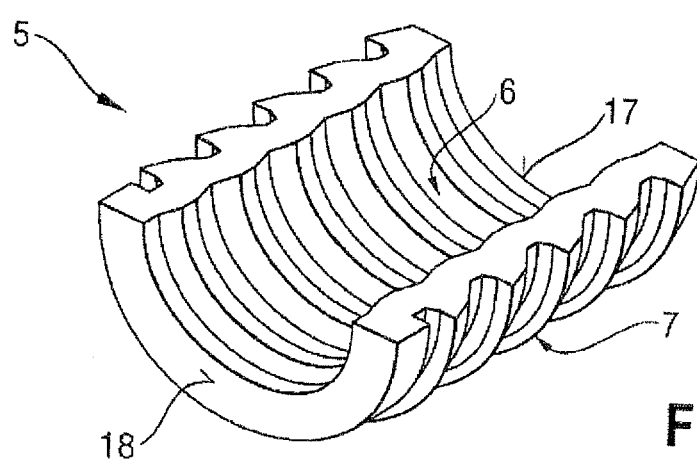
FIG. 2 shows schematically in perspective a longitudinal part of an embodiment of a system according to the invention.

FIG. 1 shows a partition 1 which is for the sake of clarity shown with a part cut out. The partition 1 divides two compartments I, II. The partition 1 comprises an opening through which a pipe 2 extends. Wherever in this specification a pipe is referred to below, the pipe may also be a duct or a cable. A conduit sleeve 3 corresponds to the opening. It is also possible to consider the conduit sleeve 3 as fittingly and sealingly fixed to a circumference of the opening. In general, the conduit sleeve is an example of a conduit which is suitable for receiving one or more cables, pipes or ducts. Such a conduit is further suitable for receiving an elastically deformable plug for sealingly filling space between an inner circumferential wall of the conduit and the member of pipes, cables or ducts extending there through. The system may comprise such an elastically deformable plug 4 which is fittingly and sealingly insertable in the conduit sleeve 3, as shown in FIG. 1. The partition wall 1 may be a steel wall. The conduit sleeve 3 may also be made of steel and may in fact comprise a steel tube. The steel tube may be welded into the opening of the partition 1. The plug 4 may comprise a single piece as suitable for situations where the plug 4 can be inserted into the conduit sleeve 3 before the pipe 2 extends through the conduit sleeve 3. However, as most often the plug 4 will be an assembly of at least two segmental longitudinal parts 5. In that case, the plug 4 can also be formed and inserted when a pipe 2 extends through the conduit sleeve 3, before insertion of the plug 4. The division between these two segmental longitudinal parts 5 of plug 4 in FIG. 1 is shown by a dashed line. A perspective view of one longitudinal part 5 of the plug 4 is shown in FIG. 2.

Figure 3:
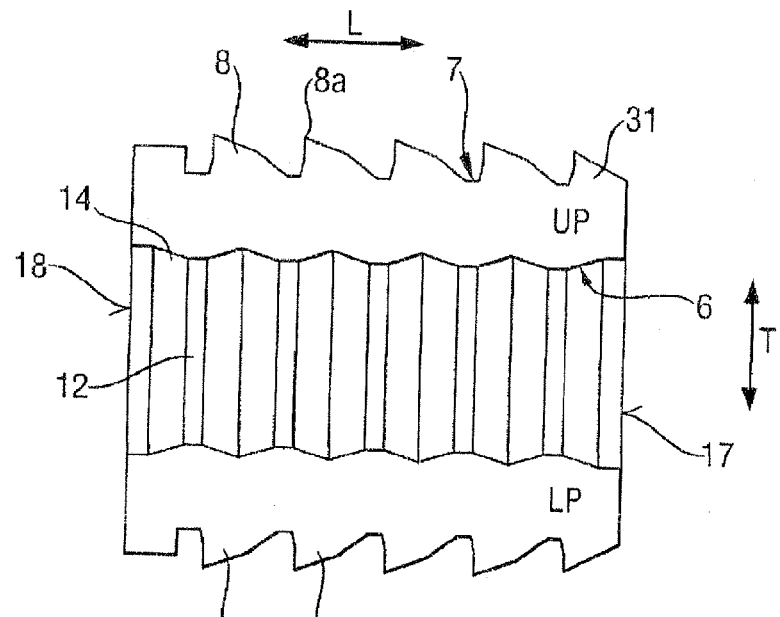
FIG. 3 shows schematically a view on a longitudinal part of a system according to an embodiment of the invention.

FIG. 3 shows schematically a view of an inner side 6 of a longitudinal part 5 of a system according to an embodiment of the invention. Two of such longitudinal parts 5 can together form a plug 4. The upper part UP and the lower part LP of FIG. 3 correspond to a cross-section along a longitudinal direction L of a longitudinal part 5. The cross-section shown in the upper part UP of FIG. 3 is shown enlarged, in FIG. 4. The longitudinal segmental part 5 is provided with an outer side 7. This outer side 7 comprises a number of outer ribs 8 having tops 8a spaced apart in the longitudinal direction of the plug 4 for realizing annular contact surfaces 9 (see FIG. 5) between the plug 5 and an inner circumferential wall 10 of the conduit sleeve 3. The inner side 6 is comprised of a number of inner ribs 11 having tops 11a spaced apart in a longitudinal direction of the plug 4 for realizing annular contact surfaces 12 between the plug 4 and the pipe 2. The term "spaced apart" encompasses a situation in which ribs have a part that is unconnected to the neighboring rib. However, "spaced apart" does not exclude a situation in which the ribs are adjacent each other.

In this exemplary embodiment, the inner side 6 is provided with a number of hingeable surface areas 15 for facilitating compression of the plug 4 in the longitudinal direction L and a transverse movement of at least one of the inner 11 and/or outer ribs 8. This hingeable surface area 15 is in FIG. 4 indicated by a circle represented by a dashed line. In this embodiment, the hingeable surface area 15 is provided by two adjacent sloped surfaces 14 of two adjacent inner ribs 11. In this example the hingeable surface area 15 is provided on the inner side 6. It can be seen that the inner side is provided with four hingeable surface areas 15. It is of course also possible that the inner side 6 is provided with only one hingeable surface area 15. However, the more hingeable surface areas 15 are provided, the more compression of the plug 4 in the longitudinal direction is facilitated. Furthermore, the more hingeable surface areas are provided by two adjacent sloped surfaces 14 of two adjacent inner ribs 11, the larger the number of inner ribs 11 that experience facilitation of a transverse movement. How the hingeable surface areas 15 result in the possibility of sealing dynamically is explained later. At this stage it is pointed out that although the hingeable surface areas 15 are in this example shown to be provided on the inner side 6, one or more hingeable surface areas may also, or alternatively, be provided on the outer side 7.

At this stage the longitudinal segmental parts 5 are described in more detail. Each inner rib 11 has preferably the shape of a trapezium. Each of the inner ribs 11 is provided with an abutting surface 13 that extends in the longitudinal direction L and that, in use; abuts the pipe 2. Each inner rib 11 is on either side of the abutting surface 13 provided with a sloped surface 14 which extends away from the abutting surface 13. The slope of each sloped surface 14 encloses an angle $\gamma$, with a transverse direction T of the segmental longitudinal part 5 such that bending of each inner rib 11 is substantially inhibited when the segmental longitudinal part 5 is inserted. The insertion will be described later. One could also say that due to the shape of the inner rib 11 and the size of angle $\gamma$ the inner ribs slide easily over the pipe 2 during insertion of the plug 4.

The slope of the sloped surface 14 is substantially constant from the abutting surface 13, from which it extends up to a point P where it meets the sloped surface 14 of an adjacent inner rib 11. Although it is shown that each slope of the sloped surface 14 of one of the inner ribs 11 is substantially the same, it is also possible that the slopes vary somewhat. The slopped surfaces 14 of the two adjacent inner ribs 11 form together a V-shaped groove, i.e. the hingeable surface area. In the example shown, all slopes of all inner ribs 11 are substantially the same. The angle $\gamma$, is between 60 and 80 degrees, preferably between 65 and 77 degrees and even more preferably between 70 and 75 degrees.

One end of the plug 4 and of each longitudinal part 5 may be denoted as the distal end 17 as this end will be distal from the part of the conduit sleeve 3 at which the plug 4, or the longitudinal parts 5, are inserted. The other end of the plug 4 and of each of the longitudinal parts 5 may be denoted as the proximal end 18, as this end remains, relative to the distal end, proximal to the part of the conduit sleeve at which insertion of the plug 4 or longitudinal part 5 occurs.

The outer ribs 8 have each substantially the shape of a sawtooth 19 with a rising surface 20 rising toward the proximal end 18. It is of course possible that only one outer rib 8 has the shape of a sawtooth 19, or that some but not all outer ribs 8 have the shape of a sawtooth 19. In this example, all outer ribs 8 have the shape of a sawtooth 19. The part 21 of the rising surface 20 adjoining the top 8a of the sawtooth 19 is, with respect to a part 22 of the rising surface 20 located further from the top 8a, provided with a levelling which includes an angle $\alpha$ with the longitudinal direction L. The part 21 provides a pressing surface 23 that in use presses against the inner wall 10 of the conduit sleeve 3. The pressing surface 23 includes the angle $\alpha$ with the longitudinal direction L. This angle $\alpha$ is smaller than an angle $\beta$ included by the surface of the part 22 of the rising surface 20 located further from the top 8a and the longitudinal direction L. The angle $\alpha$ is in any case larger than zero.

A meeting of the levelling part 21 and part 22 of the rising surface 20 forms an outwardly directed bend 24 located in the rising surface 20. Although, in this example, the bend 24 is formed by a meeting of straight surfaces, it is also possible that the bend is formed by a meeting of surfaces which merge more gradually with regard to the orientation of the surfaces. A falling surface 25 of the sawtooth 19 is provided with a part 26 located relatively far from the top 8a, which is designed so as to be inclined towards the proximal end 18 with respect to a part 27 of the falling surface 25 adjoining the top 8a. The part 27 of the falling surface 25 adjoining the top 8a of the sawtooth 19 includes an angle $\theta$ with a longitudinal direction L. The angle $\theta$ is larger than the angle $\omega$ which is included by the part 26 of the falling surface 25 located further from the top 8a and the longitudinal direction L.

A meeting 28 of the part 27 of the falling surface 25 adjoining the top 8a of the sawtooth 19 and the part 26 of the falling surface 25 located further from the top 8a forms an inwardly directed bend 28 located in the falling surface 25. The bend or meeting 24 is in transverse direction located further outwardly than the bend 28. The note made above for the bend formed by meeting 24 also holds for bend 28. That is, a more gradual merge from the part 27 of the falling surface 20 and the part 26 is in this specification also understood to be a bend. It is further noted that it is also possible to provide a sawtooth 19 with a bend 28 in the falling surface 25 without the rising surface 20 of the sawtooth 19 comprising a levelling.

Figure 4:
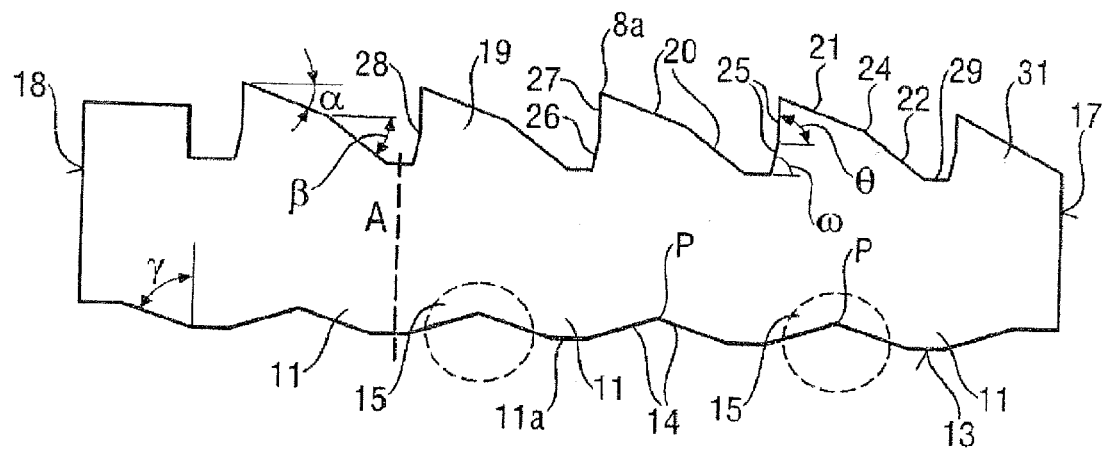
FIG. 4 shows schematically a cross-section of a longitudinal part of a system according to the embodiment shown in FIG. 3.

It is further visible in FIG. 4 that an imaginary transverse plane of the first type A intersects an outer surface 29 on the outer side 7 and an abutting surface 13 on the inner side 6. The outer surface 29 and the abutting surface 13 which both intersect the same imaginary transverse plane A, have a similar length in the longitudinal direction L. Over the entire length of the longitudinal direction of the outer surface 29 and/or the abutting surface 13, which both intersect the same imaginary transverse plane A, that outer surface 29 and that abutting surface 13 are substantially parallel to each other.

Figure 5:
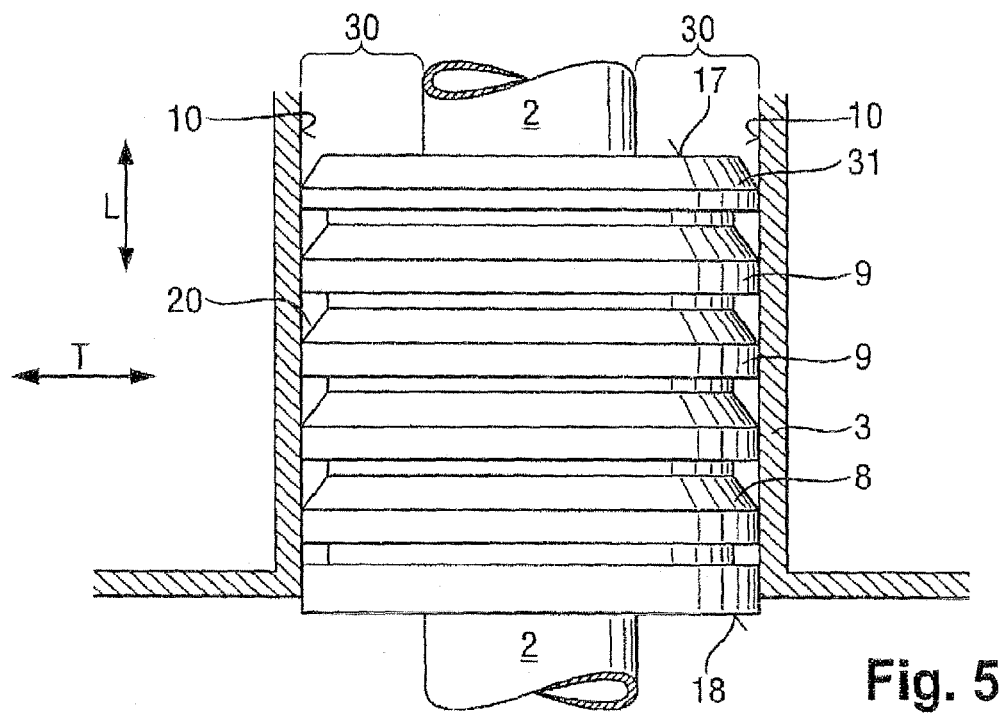
FIG. 5 shows schematically a plug as assembled by longitudinal parts according to FIG. 3 and as received in the space between an inner wall of a conduit sleeve and one pipe, cable or duct received in the conduit sleeve.
Figure 6:
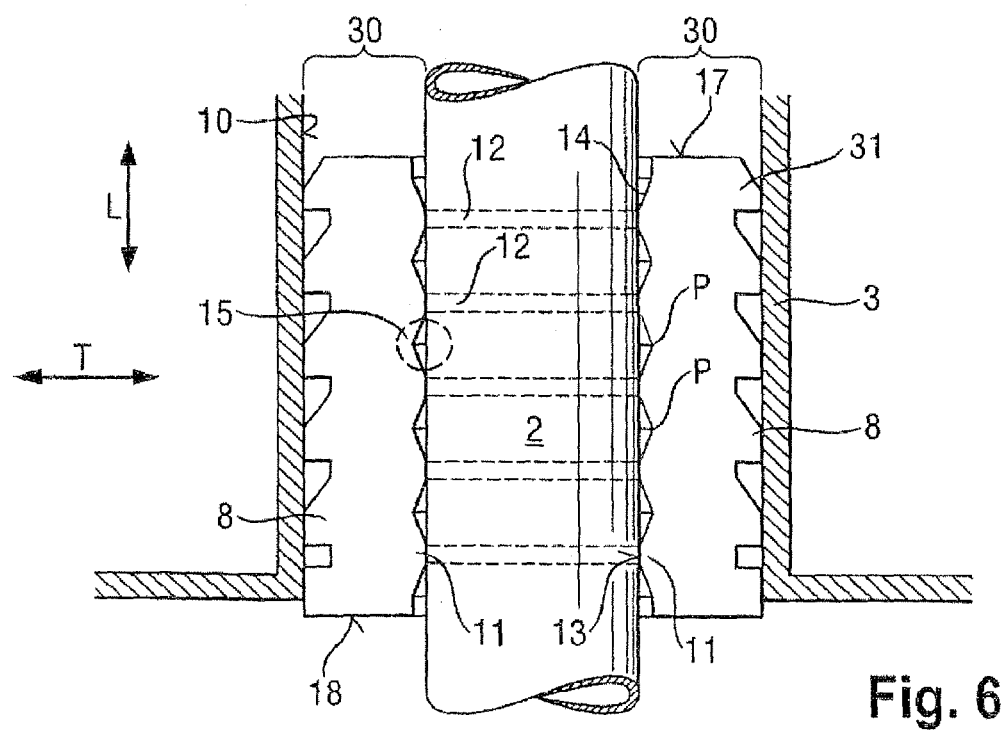
FIG. 6 shows schematically a partial cross-section of a longitudinal part according to FIG. 3 as received in the space shown in FIG. 5.

FIG. 5 and FIG. 6 show schematically in more detail how the longitudinal parts 5, and thus the plug 4, cooperate with the inner wall 10 of the conduit sleeve 3 and with the pipe 2 as received in the opening. FIG. 5 shows the inner wall 10 of the conduit sleeve 3 in cross-section, while the sealing plug 4 formed with the aid of the longitudinal parts 5 is shown in a view such as would be seen when one half of the conduit sleeve 3 would have been removed. In general, when the pipe 2 extends through the conduit sleeve 3 before insertion of the plug 4 occurs, the longitudinal parts 5 are tightly applied around the tube 2 and then, by a movement in the longitudinal direction L, forcefully pushed into the space 30 between the inner wall 10 of the conduit sleeve 3 and the pipe 2.

As towards the distal end 17, each longitudinal part 5 comprises on the outside 7 a run-in rib 31, insertion is facilitated. The run-in rib 31 extends up to an outer circumferential level that is in transverse direction less outward than an outer circumferential level up to which each other outer rib 8 extends.

Upon further pressing in the longitudinal direction L, also inner ribs 11 will contact the inner wall 10 of the conduit sleeve 3. Particularly the top 8a and at least a part of the pressing surface 23 will contact the inner wall 10. In order to overcome frictional forces occurring during the insertion, it is most often necessary to provide the longitudinal parts and/or the inner wall 10 of the conduit sleeve 3 and/or pipe 2 with a lubricant such as for instance Vaseline or soft soap. Particularly when inner wall 10 is manufactured from concrete, this provides a good solution for reducing the high frictional forces.

The plug 4, and the longitudinal parts 5 should be manually insertable. However, in some cases, it may be necessary to move the sealing plug 4 as then formed by the longitudinal parts 5 further distally in the direction L by using, for instance, a hammer. An assisting workpiece made of for instance wood, or a hard plastic, and having a shape such that it can freely be inserted into the space 30, may be helpful for placing against the proximal end 18 of the plug 4 so that the hammer can hammer instead of the plug the workpiece distally into the longitudinal direction, so that the longitudinal parts 5 of the plug 4 will not be damaged by the hammer.

It will be clear that when the plug 4 has fully been inserted into the conduit sleeve, at least a part of each pressing surface 23 will be pressing against the inner wall 10 of the conduit sleeve 3.

FIG. 6 shows the inner wall 10 of the conduit sleeve 3 in cross-section. The plug 4 as inserted is presented as viewable in the same cross-sectional plane. The annular contact surface 12 formed by the abutting surfaces 13 of the longitudinal parts 5 are shown in dashed lines. It will be clear that the plug 4 can be inserted much further distally than shown in FIGS. 5 and 6.

It will also be clear that any attempt to move the plug 4 as inserted in the conduit sleeve 3 proximally, due to for instance a high pressure applied on the distal end 17, the frictional forces at the annular contact surfaces 9 and 12, will resist such a movement. It has been found that, in some cases, a plug 4 assembled from longitudinal parts 5 will resist movement up to a pressure of 7 bar as applied to the distal end 17.

Without wishing to be bound by any theory, it is believed that the sealing system according to the invention works as follows in a dynamic fashion. The illustration of FIG. 6 might be helpful in understanding this possible working of the invention. When the proximal end 18 and distal end 17 of the plug 4, either as a one-piece plug, or as composed of longitudinal parts 5, are compressed to each other, the hingeable surface area 15 responds in the sense that the two adjacent sloped surfaces 14 of two adjacent inner ribs 11, tend to enclose a smaller angle than before the compression. The two inner ribs 11 to which the adjacent sloped surfaces 14 belong, experience a transverse inward force. The width of the annular contact surfaces 12 will as a result thereof increase. The width is a dimension of the annular contact surfaces in the longitudinal direction. This improves the sealing between the plug 4 and the surface of pipe 2. However, as pipe 2 is not giving way, the pipe 2 exerts a reaction force onto the inner ribs 11. A response of the plug 4 is that the outer ribs 8 are pushed outwardly in a transverse direction, i.e. radially outwardly in this example. As a consequence thereof, a larger surface area of the pressing surface 23 will contact the inner wall 10 of the conduit sleeve 3. In other words, the width of the annular contact surface 9 will also increase. Also in this case the width is dimension in longitudinal direction of the annular contact surfaces 9. Consequently, the sealing between the plug 4 and the inner wall 10 of the conduit sleeve 3 is also greatly improved.

It will easily be understood that when the compression of the plug 4 in the longitudinal direction L ceases, the plug 4 will tend to relax back towards its position that it had before the compression occurred. As such, the system responds dynamically upon compression of the plug in the longitudinal direction by improving the sealing integrity when the pressures exerted on the distal and proximal ends of the plug increase.

The plug remains somewhat flexible when uncompressed, allowing for vibration and shock absorption and a relatively low load applied to the pipe and inner wall of the conduit.

FIGS. 7 to 11 show further embodiments of a system according to the invention. In these embodiments the system further comprises a blocking element 37 for hindering, when in use an external pressure gradient is present between both ends of the plug, movement of the downstream end of the plug downstream the pressure gradient.

Figure 7:
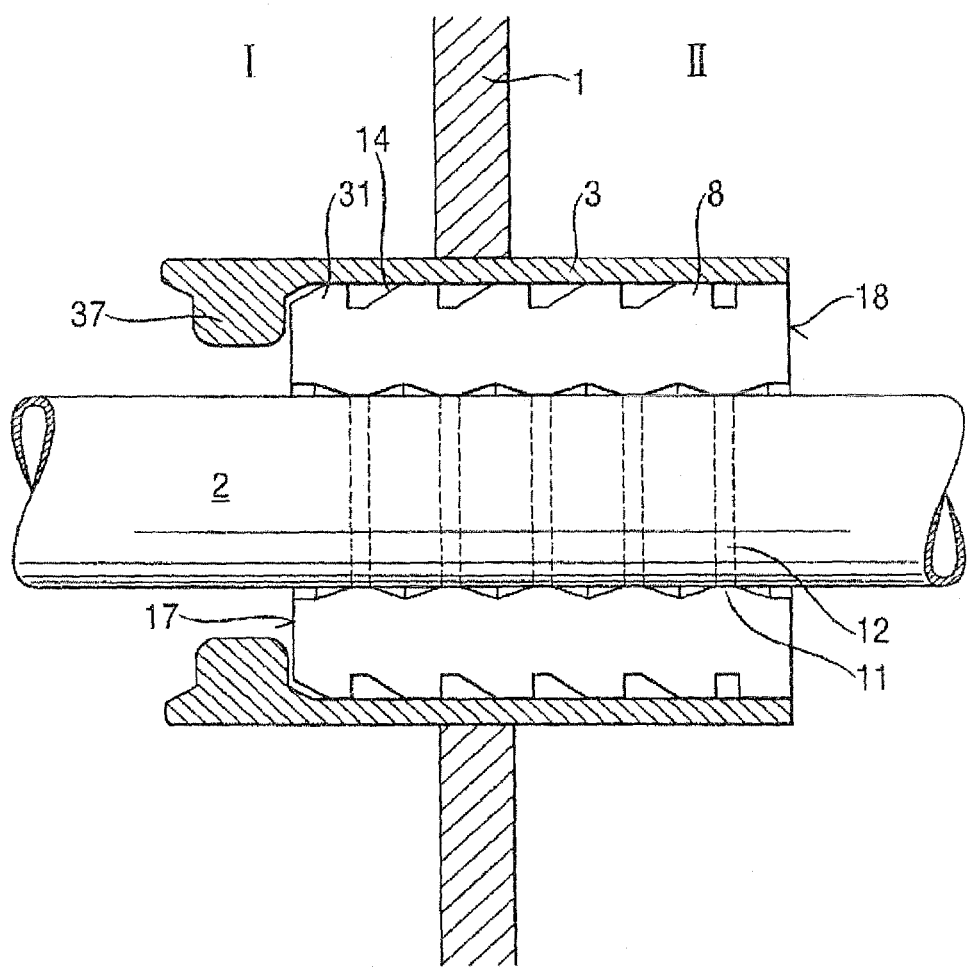
FIG. 7 shows schematically a further embodiment of a system according to the invention.

FIG. 7 shows an embodiment of a system according to the invention as suitable in a situation wherein the hazardous side of the partition 1 is known. In this situation a high pressure is expected to occur, when it occurs, in compartment II rather than in compartment I. The system comprises a blocking element 37 for hindering, when in use an external pressure gradient is present between both ends 17, 18 of the plug 4, movement of the downstream end 17 of the plug 4 downstream the pressure gradient. In other words when a very high pressure is present in compartment II and a low pressure is present in compartment I, the plug 4 will be compressed by movement of proximal end 18 towards distal end 17. When the pressure in compartment II is thus very high, the plug will compress and the annular contact surfaces 9, 12 will enhance as explained when discussing FIG. 6. In this particular embodiment blocking element 37 is fixed to the conduit sleeve 3. In fact, in this embodiment the blocking element 37 may even be considered as a part of the conduit sleeve 3. Although the blocking element 37 may be welded to the conduit sleeve 3, it is preferred that the conduit sleeve 3 and the blocking element 37 are formed by a milling process. Inner wall of the conduit sleeve 3 has preferably a surface with a low coefficient of friction. The surface may have been polished. This facilitates movement of proximal end 18 towards distal end 17 and thus compression of the plug 4 in the longitudinal direction L. In this embodiment, the blocking element 37 is substantially annularly shaped. A side of the blocking element 37 facing the distal end 17 of the plug 4, may at least partly have a shape that matches the shape of the distal end 17 and the running rib 31 of the plug 4. It is further important to note that the blocking element should not extend radially inward too much, to avoid contact with pipe 2 not only when pipe 2 has been inserted in the conduit sleeve 3 but also when the pipe 2 is being inserted in the conduit sleeve 3. To avoid any damage to pipe 2 should the pipe 2 make contact with blocking element 37, the blocking element has edges which are rounded off.

Figure 8:
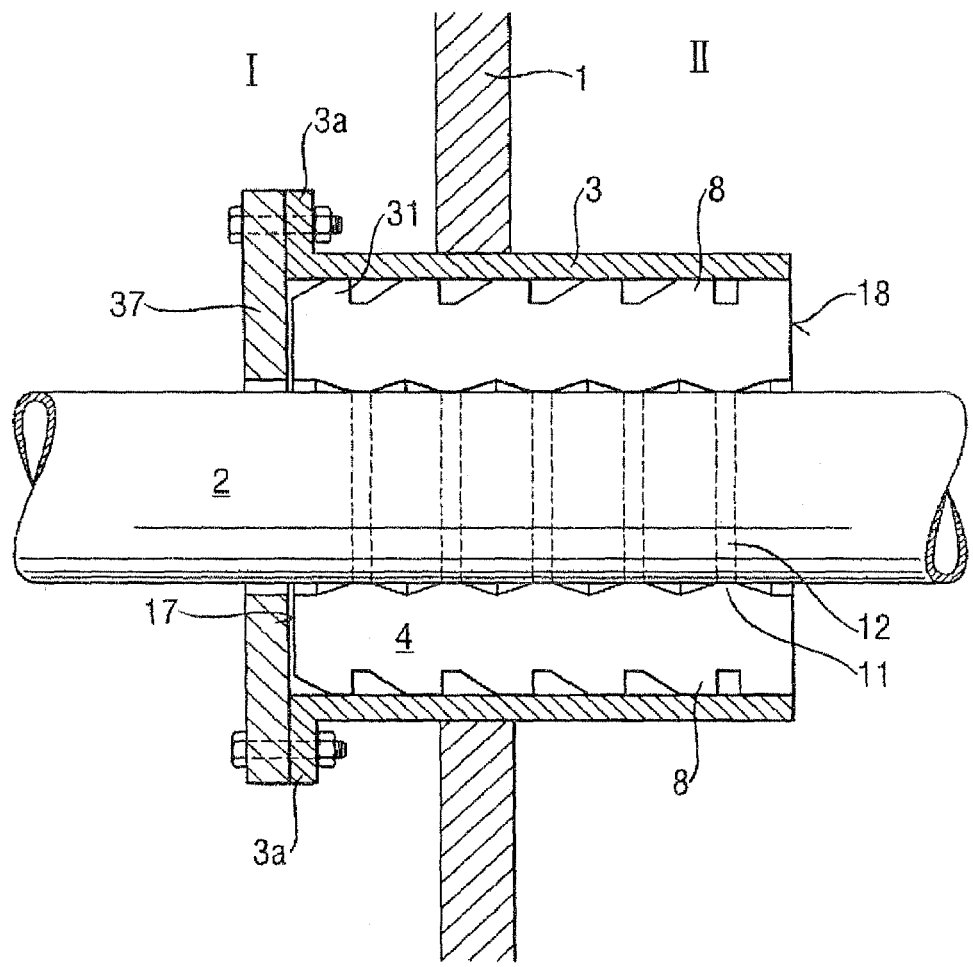
FIG. 8 shows schematically a further embodiment of a system according to the invention.

Another embodiment of a system according to the invention is shown in FIG. 8. This embodiment is also suitable for a situation wherein the hazardous side is known, i.e. the high pressure is expected to occur in compartment II rather than in compartment I. In this embodiment, the conduit sleeve 3 and the blocking element 37 are separate pieces. Conduit sleeve 3 is provided with a collar 3a that extends radially outward from an end of the conduit sleeve 3 by which in use the distal end 17 of the plug will be surrounded. The blocking element 37 may comprise two parts that form together in use an annular retainer ring. This ring can be fixed around pipe 2 and to the collar 3a of conduit sleeve 3, once the pipe has been inserted, by for instance making use of bolts and nuts and suitably aligned bore holes in respectively retainer ring 37 and collar 3a. Although it is shown that the blocking element can extend radially inward a little bit further and even very close to pipe 2, it is still preferred that a retainer ring has a much smaller radial inward length. It is also preferred that the edges of the retainer ring facing the pipe 2 are rounded off. If conduit sleeve 3 happens to be a very long conduit sleeve, i.e. much longer than the length of plug 4, it is preferred that a rubber sleeve is inserted first in the annular space between the inner wall of the conduit sleeve 3 and the pipe 2 before fixing the blocking element 37. This rubber sleeve (not shown in FIG. 8) surrounds pipe 2 and ensures that in the case of a very high pressure in compartment II as opposed to the pressure in compartment I, plug 4 does not need to move through the entire length of the conduit sleeve 3 before compression of the plug 4 occurs. Instead, but compression can start almost straight away, leading to a fast response of the dynamic sealing system. An improvement of the sealing integrity may further be in line with the mechanism as proposed when discussing FIG. 6.

Figure 9:
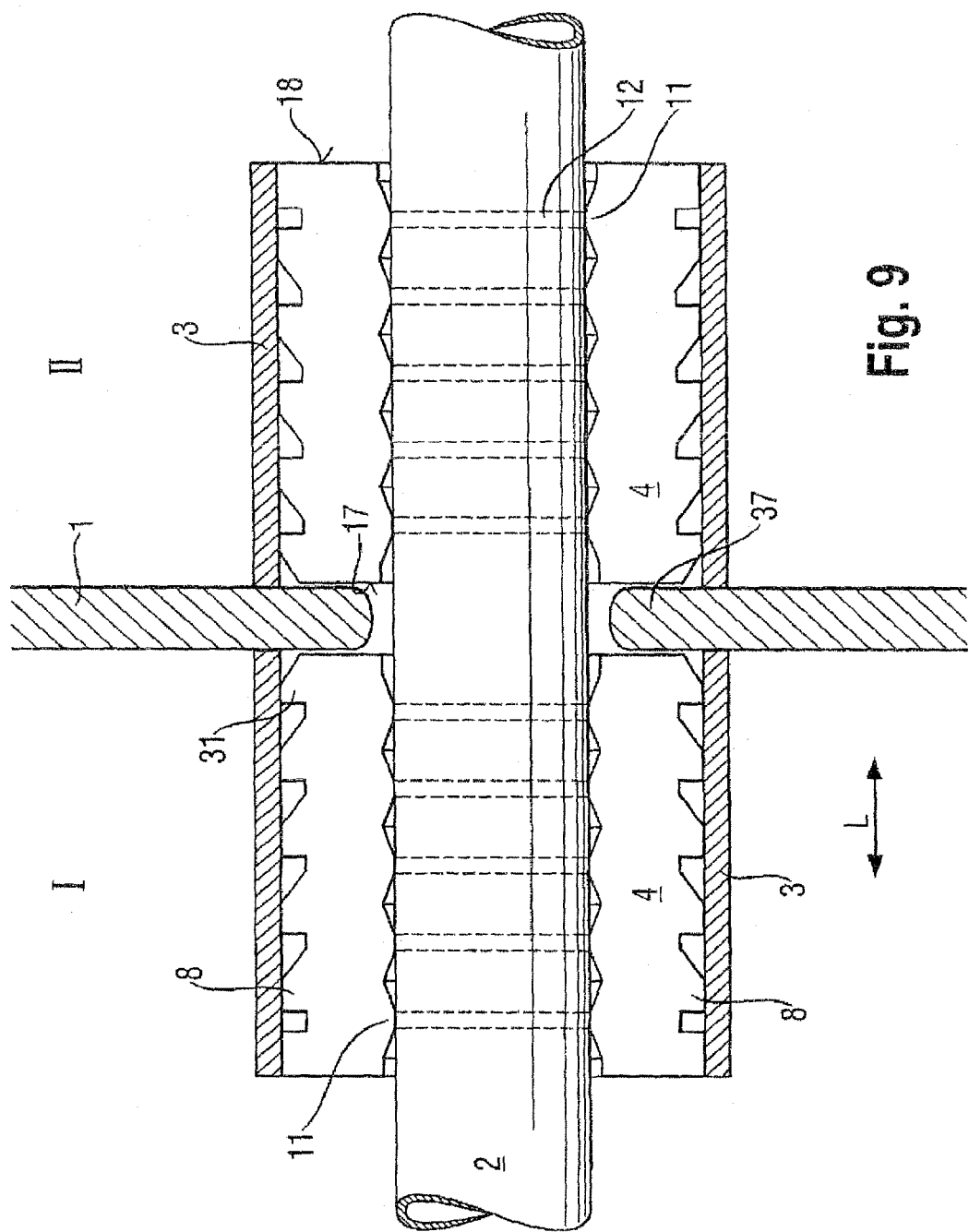
FIG. 9 shows schematically a further embodiment of a system according to the invention.

FIG. 9 shows an embodiment of the system according to the invention that is suitable for a situation wherein it is unknown from which side of the partition 1 a hazardous event may approach the conduit sleeve 3. This embodiment is particularly suitable for resisting a fire that may break out on either side of the partition 1. The system comprises two plugs 4. One of those two plugs 4 is inserted from compartment I into the conduit sleeve 3 and the other one of the plugs 4 is inserted from compartment II into the conduit sleeve 3. In this embodiment, the blocking element 37 is situated between the two plugs 4. Although it is possible that the blocking element 37 is again a retainer ring that is for instance welded to an inner wall 10 of the conduit sleeve 3, it is, as shown, also possible that the opening in partition 1 is actually smaller than the diameter of the conduit sleeve 3 which is coaxially welded around a circumference of the smaller opening in the partition 1. A part of the partition 1 is then within the conduit sleeve 3 acting as a retainer ring, i.e. as a blocking element 37. Although, again the blocking element as shown extends radially inward to a rather large extent, it is preferred that the radial inward length of the blocking element is somewhat shorter.

Figure 10:
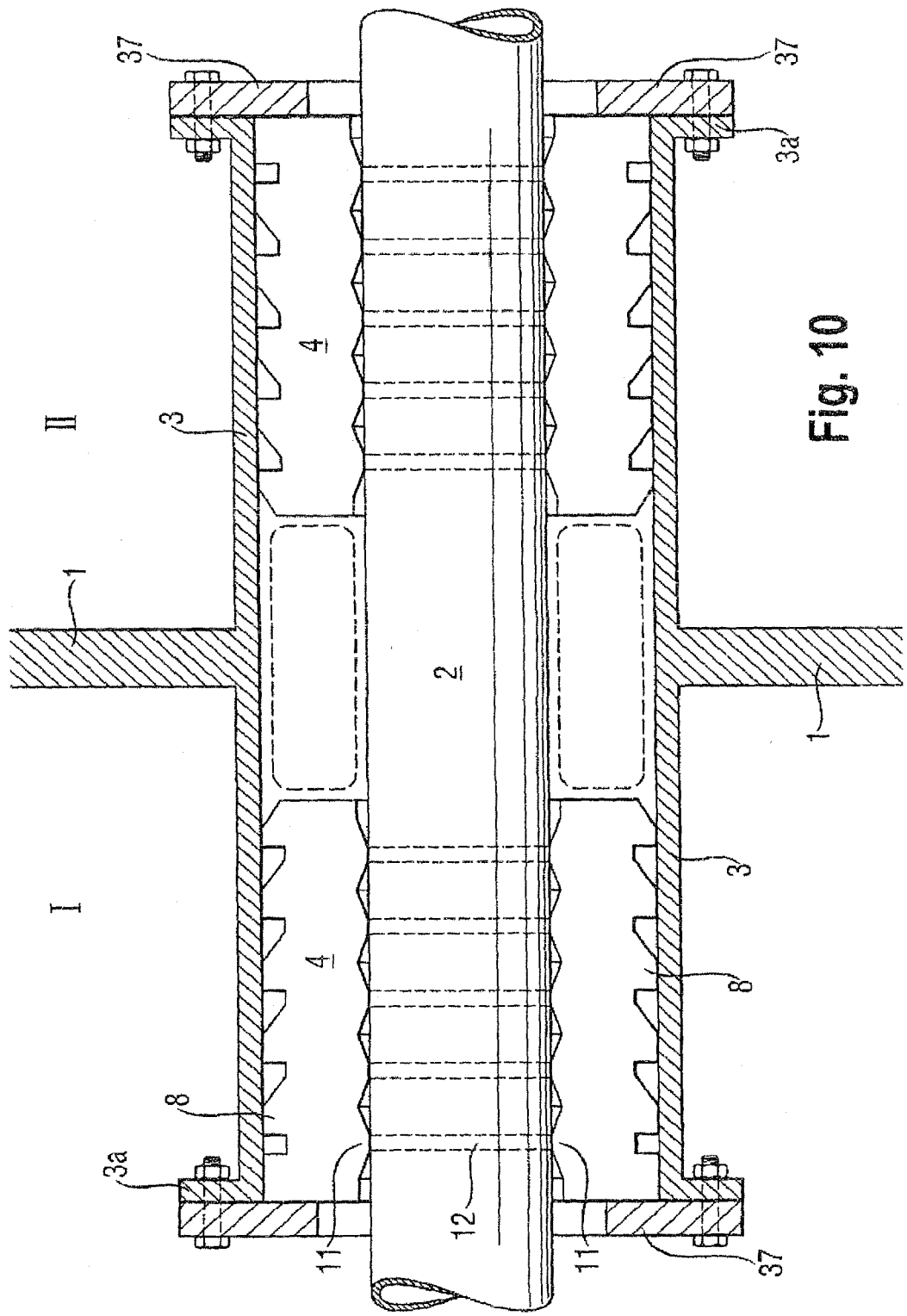
FIG. 10 shows schematically a further embodiment of a system according to the invention.

FIG. 10 shows an embodiment of a system according to the invention, that is also suitable for a situation in which one does not know from which side the hazardous event, like for instance a fire, could approach the conduit sleeve 3. The system comprises again blocking elements 37 which are, as shown, fixable to the conduit sleeve 3 in a way described when the embodiment of FIG. 8 is discussed. It is preferred that the volume of the air entrapped in the conduit sleeve between the distal end 17 of the two plugs 4, is as short as possible. This may be achieved by providing a conduit sleeve 3 having a length that is just a little bit more than the total length of two plugs 4, or by insertion of a rubber sleeve (shown in dashed line) in the conduit sleeve 3 so that the sleeve is positioned between the two plugs 4. The air gap between the plugs 4 works as thermal insulation. If as a result of thermal expansion the pressure of the air in the air gap is built up, the air gap itself may work as a blocking element, facilitating compression of the plug that experiences a high pressure on the proximal end 18. This may even occur without the thermal expansion. In particular, in situations where the volume of the air gap is small, a slight further reduction of that volume, will raise the pressure of the air trapped in the gap. The gap may then act as a blocking element.

Figure 11:
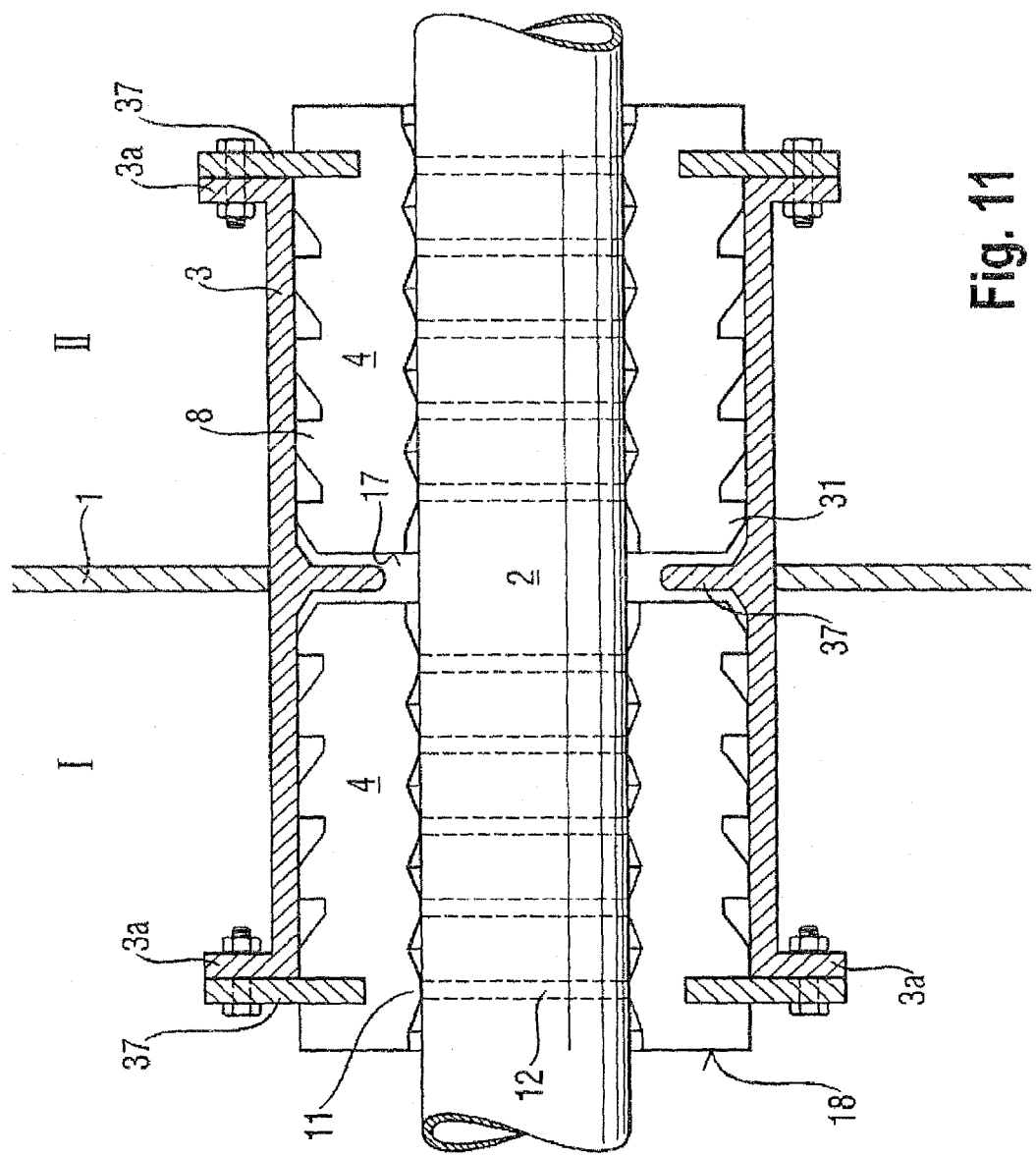
FIG. 11 shows schematically a further embodiment of a system according to the invention.

Finally, FIG. 11 shows an embodiment of a system according to the invention, wherein the conduit sleeve itself is rather short. In this embodiment the plugs 4 are each provided with an annular slot that extends from the outer side of the plug 4 inwardly in a transverse direction. This slope is provided between the outer rib that is closest to the proximal end 18 of the plug 4 and the proximal end 18 itself. After insertion of the plug 4 this annular slot can as shown receive the blocking element 37 which is further fixable to the collar 3a of conduit sleeve 3, as described when discussing the embodiment shown in FIG. 8.

It will be clear that a blocking element 37 that is fixable to the conduit sleeve is preferably a multiple part element or at least an element that can surround a pipe without the need for sliding the blocking element over the pipe at one of the ends of the pipe.

A further blocking element 37 may be provided between plugs 4 as shown, but this is not necessary.

When an explosion occurs in compartment II, the embodiment shown in FIG. 9, FIG. 10 and FIG. 11 will ensure that at least the plug present in the conduit sleeve and extending or facing the compartment I, will remain in the conduit sleeve 3 when the complete partition is moved into the direction of compartment I along the longitudinal direction L. The embodiment shown in FIG. 10 and FIG. 11 will hold both the plugs 4 independent of the direction into which partition 1 is blasted along the longitudinal direction L. A particular advantage is that there is not only a dynamic response of the sealing system available, but also that in a situation wherein the entire partition is moved in a longitudinal direction L due to for instance an explosion, the conduit sleeve 3 including the plugs 4 will equally move up with partition 1 during that movement.

Elastic material employed for the production of the segmental longitudinal parts 5, i.e. for the plug 4, is preferably of a fire resistant quality. The rubber may be designed such that it expands upon exposure to elevated temperatures. It is also possible to use silicon rubber. A suitable EPDM may also be employed. The hardness may, for instance, be 70 Shore A. Any rubber with sufficient flexibility and a compression set similar to the compression set of EPDM is suitable. Also electrically conductive rubber is among the possibilities. During the manufacture of the longitudinal parts, use will usually be made of a mold suitable for this purpose. Such a production process is known per se. For instance, injection molding or compression molding may be used. The blocking element may be of metal, but in cases where the blocking element is fixable to the conduit sleeve 3 these may also be made of a hard plastic, such as for instance polyetherimide (PEI) or, alternatively, polyethersulfonamide (PES).

The invention is not limited to the embodiment shown above. It is for instance possible that the plugs are suitable for sealing a conduit sleeve through which a plurality of pipes extend. Further reference is made to WO 2004/111513, in particular the figures for plugs designed for filling space in a conduit through which more than one pipe extends, and to FIG. 17 as further discussed below.

Although, preferably, the sealing plug 4 has a substantially cylindrical design, a deviation from this shape is also among the possibilities. Thus, the system can be designed such that the system is suitable for conduit sleeves which are quadrangular and/or rectangular. Embodiments suitable for multi-angular conduit sleeves are not precluded either. Even embodiments for other non-circular, for instance, oval shaped conduit sleeves, are among the possibilities. The same holds true for the suitability with regard to the pipes and cables and ducts to be fed through the conduit sleeve. The system can be designed such that, in use, pipes and the like with a cross-section deviating from a circular shape can be enclosed by the plug. If desired, the skilled person will be able to adjust the dimensions to the required circumstances.

The way the blocking element is fixed or fixable to the conduit sleeve can be according to many different mechanisms. The blocking element may be fixed at the conduit sleeve by welding. However, the blocking element 37 may also be fixed to the conduit sleeve by being integrally connected, as a result of being machined out of one single piece of metal, or being moulded in one single mould. The blocking element 37 may be fixable by for instance a mechanical connection, using for example one or more screws, or a latch mechanism, all well known in the art.

One embodiment of a system according to the invention provides a sealed transit for a situation wherein one or a plurality of cables, pipes or ducts extend through the transit. Reference is made to FIGS. 12-16. In this particular embodiment, the system comprises a frame 100 which is sealingly fixed (not shown) or fixable into or onto an opening. It will later be explained how such a frame can be fixed into or onto an opening. The frame 100 comprises basically a plurality of conduits 203. The FIG. 1 and FIGS. 5-11 show, as discussed above, only embodiments which comprise as a conduit 3 a single conduit sleeve 3. Those figures also show a frame 100. However, the frame shown in those figures comprise each only one conduit sleeve 3. Hence, each of those frames comprise a single conduit.

Each conduit shown in the drawings of this specification is suitable for receiving at least one of a plurality of cables, pipes or ducts 2. Each conduit is further suitable for receiving the elastically deformable plug 4 for sealingly filling the space 30 between the inner circumferential wall 10 of the conduit and the cables, pipes or ducts 2 extending through that conduit. Also the system shown in the FIGS. 12-16 comprise at least one blocking element 37 for hindering in each conduit 203 movement of one end of a plug 4 which is inserted in that conduit 203.

Figure 12:
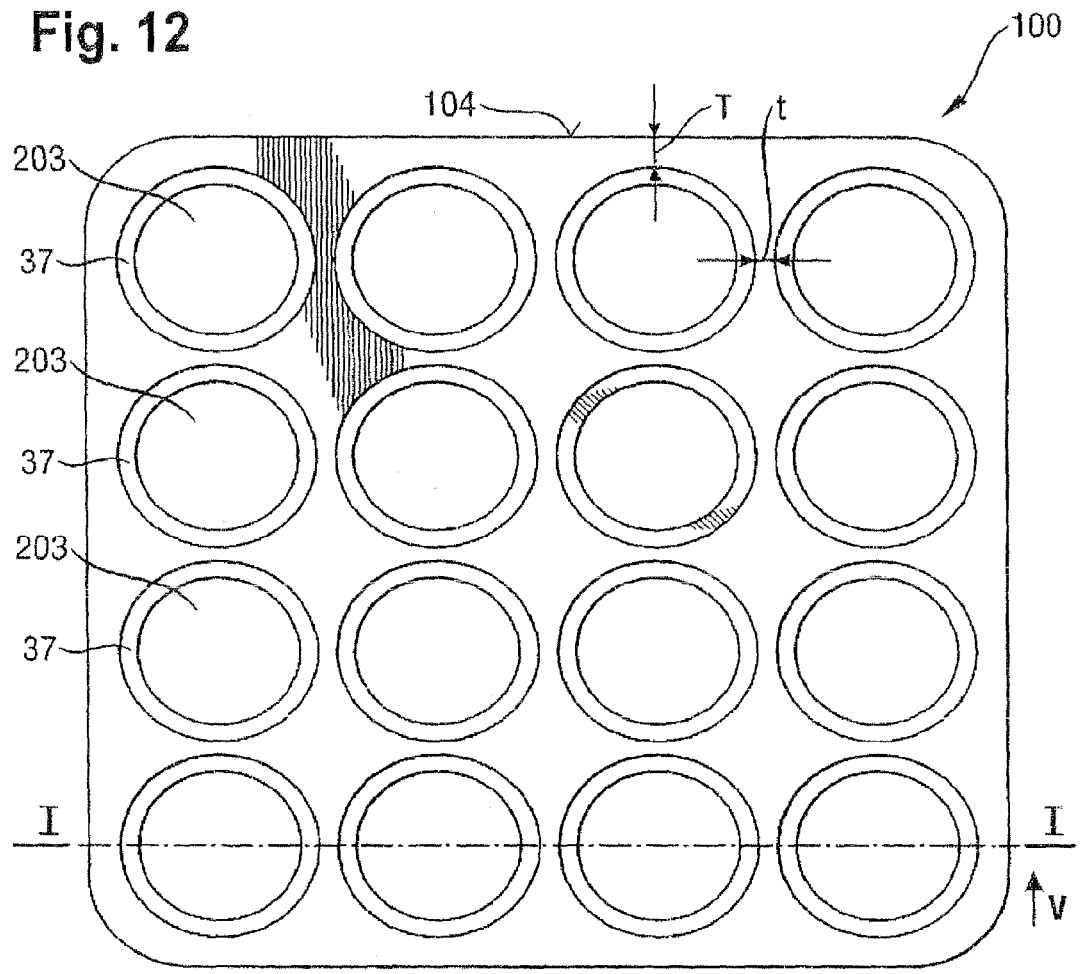
FIG. 12 shows schematically a top view of a further embodiment of a system according to the invention.
Figure 13:
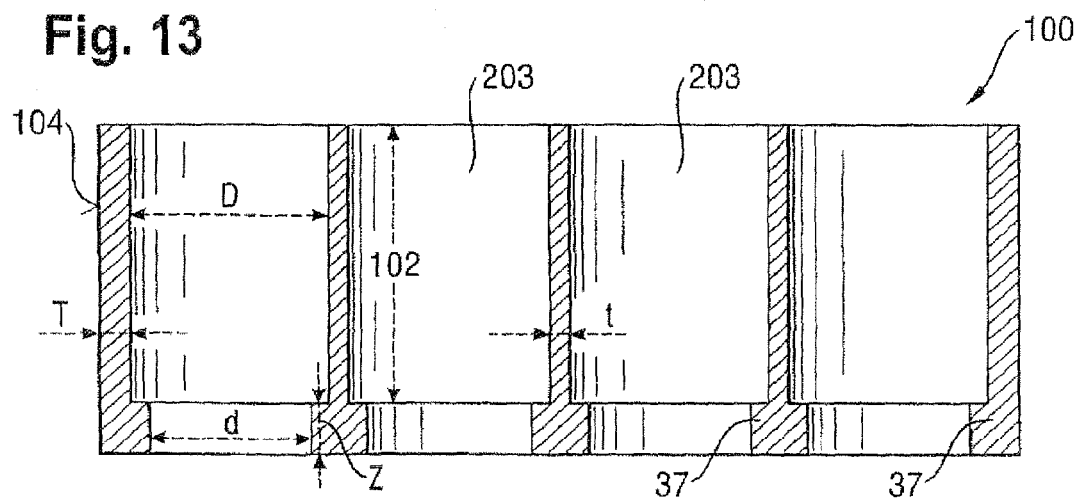
FIG. 13 shows schematically a view of a cross section along the line I-I and seen in the direction of arrow V indicated in FIG. 12.

FIG. 13 shows a view of a cross section taken along the line I-I as seen in the direction of arrow V as indicated in FIG. 12. It is visible that the blocking elements 37 are each fixed to the frame 100. In fact, in the embodiment shown in FIGS. 12 and 13, each blocking element 37 is integrally connected to the frame 100. The blocking elements 37 are each fixed within one of the conduits 203. The embodiment shown in FIGS. 12-16 can be fabricated by machining the conduits 203 in a single block of material. Towards one end of the block the conduits 203 are much narrower than at the other end of the block. The decrease of diameter of the conduit 203 provides the blocking element 37. The diameter of the conduit 203 is shown in FIG. 13 by the dashed arrow line indicated by "D". The diameter of the conduit 203 at the position of the blocking element 37 is shown by the dashed arrow line indicated by reference "d". The frame 100 and all the blocking elements 37 comprise in this embodiment together a single piece.

The inner circumferential wall 10 of each conduit sleeve 3 has preferably a surface with a low coefficient of friction formed by, for instance, a suitable milling process. This facilitates insertion of the plug 4 and accelerates the response of the plug 4, as described earlier, upon a sudden high pressure exerted on the proximal end of the plug 4.

Figure 14:
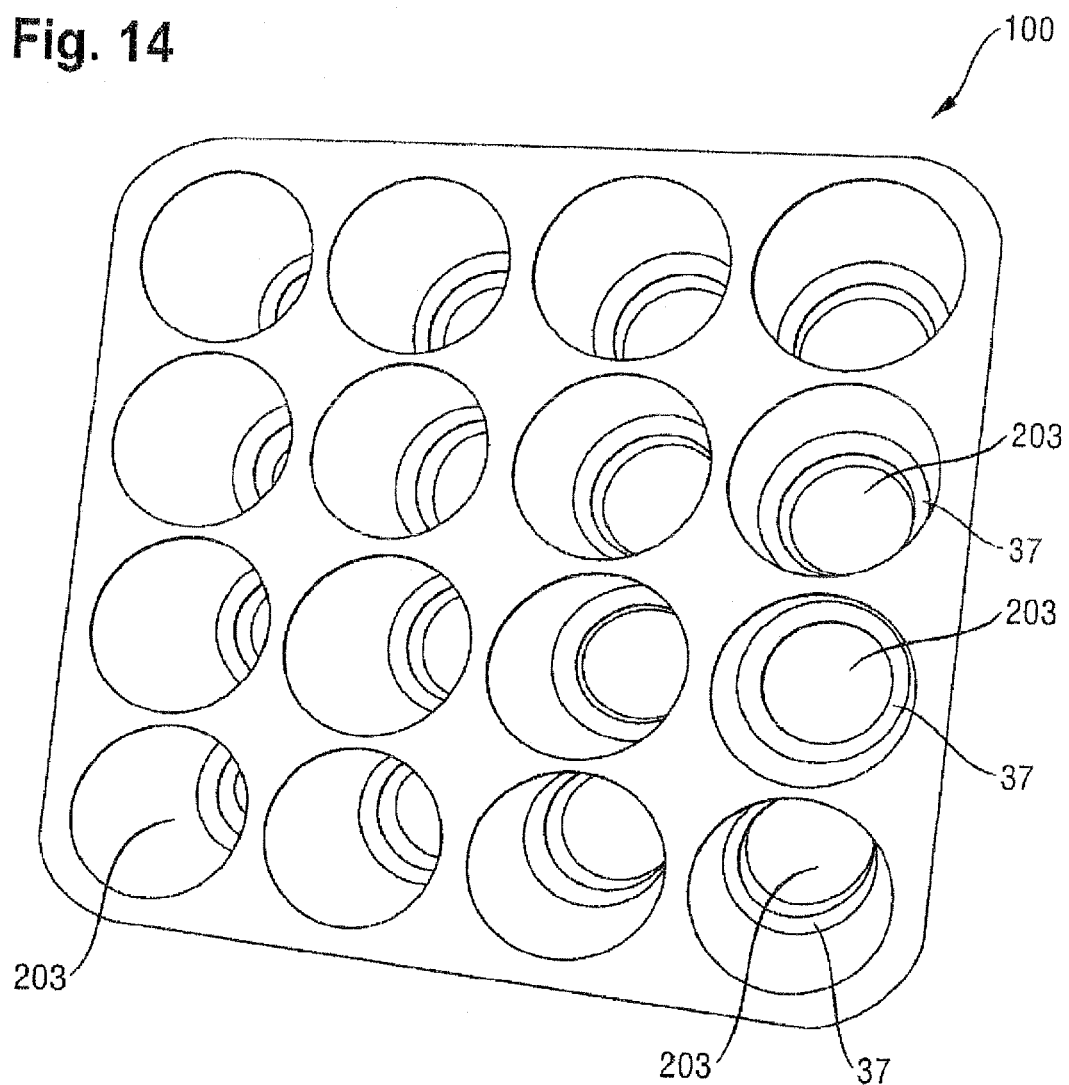
FIG. 14 shows schematically a perspective view of an embodiment of which the top view is shown in FIG. 12.
Figure 15:
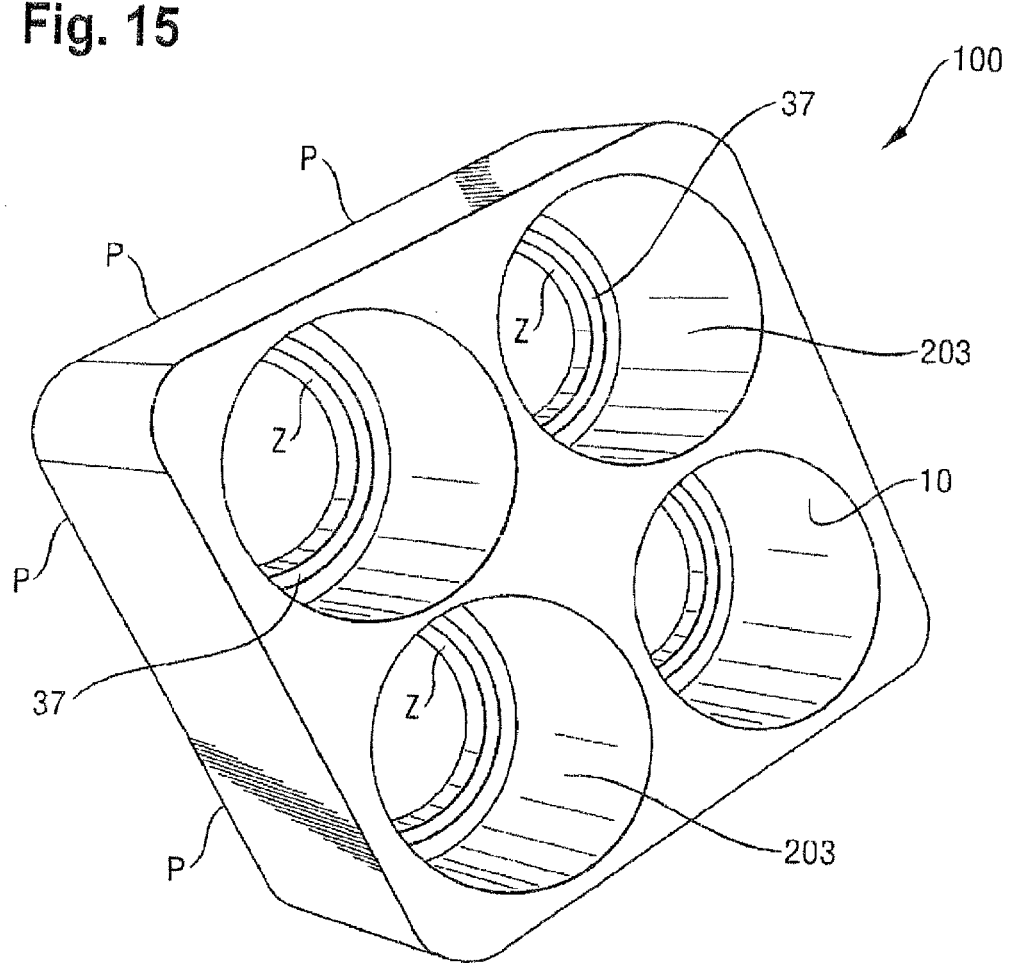
FIG. 15 shows schematically in perspective a further embodiment of a system according to the invention.

In the embodiment shown in FIGS. 12-16 the frame 100 and all the blocking elements 37 comprise together a single piece. The block of material out of which such a frame is machined, is preferably of steel or aluminium. This allows for welding of the frame 100 to a similar countermaterial of which, for instance, a partition is made. The frame may be provided with a flange F, as schematically shown in dashed lines in FIG. 16, for welding the frame 100 to a steel or aluminium construction element (not shown). Such a flange may provide a buffer zone Z for accommodating thermal stresses occurring during or after welding, thereby avoiding excessive alteration of dimensions of the conduits 203. However, it is also possible that such a buffer zone is provided by providing the blocking element 37 at a relatively long distance from the position of the frame 100 that would be affected by the welding procedure. The schematic embodiment shown in FIG. 15 shows that the ring-shaped blocking element 37 is positioned away from positions P at which the frame 100 may be welded against a partition. The buffer zone may, of course, also be provided by the blocking element 37 itself as is schematically shown in FIG. 13.

Also in transverse directions the frame 100 may be provided with a buffer zone Z, with or without the flange F. In relation to this, the minimum thickness "t" of the frame between two neighbouring conduits, is thinner than the minimum thickness of material T, situated between outer side face 104 and a nearest conduit 203.

The flange F is also suitable in cases where the frame is preferably bolted to a part of a partition that surrounds an opening. The flange F is further suitable for openings which have dimensions which cannot be covered by the frame without the flange F. When bolting is applied a sealing gasket will be used, as known in the art.

Figure 16:
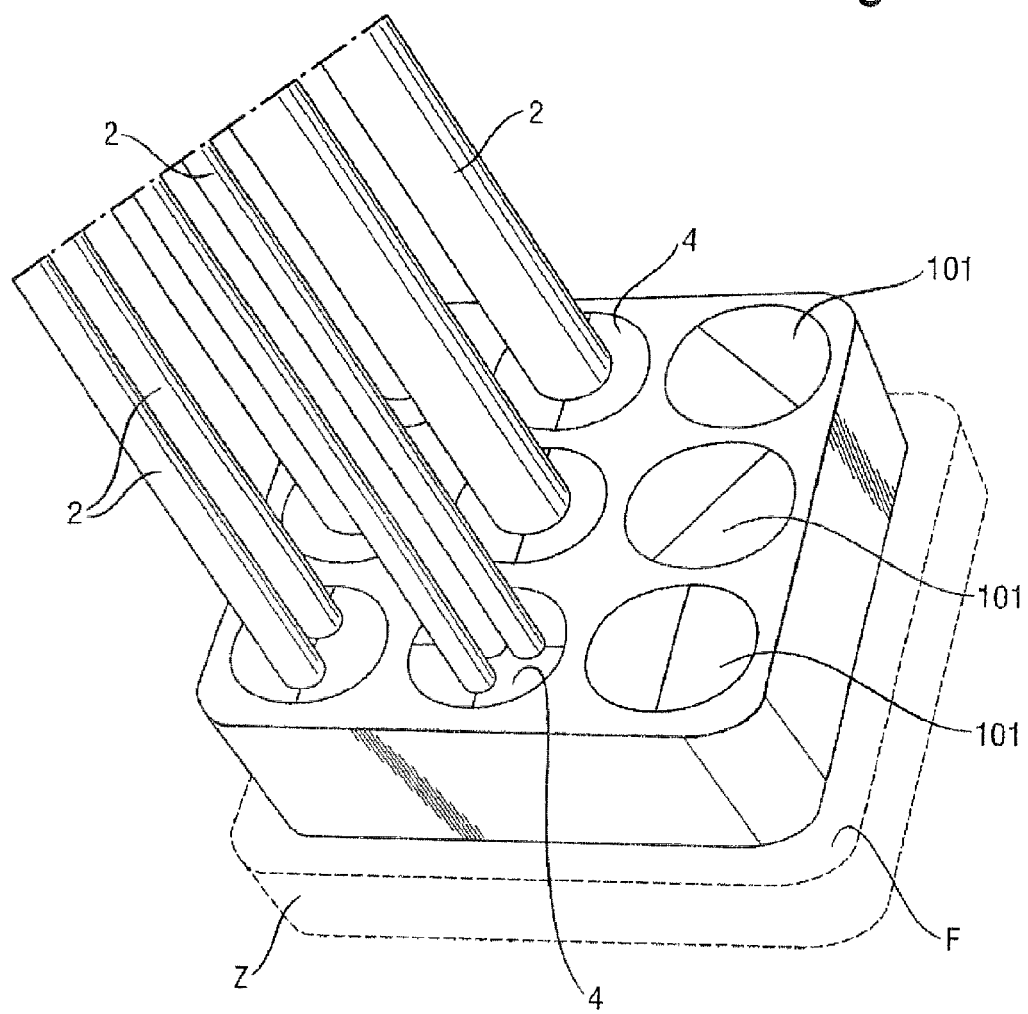
FIG. 16 shows schematically in perspective a further embodiment of a system according to the invention.

Although FIGS. 12-14 show a frame 100 having sixteen conduits 203, any number of conduits 203 is possible. FIGS. 15 and 16 show a frame 100 with respectively four and nine conduits 203. It will be clear that a frame 100 may have any suitable shape, i.e. is not necessarily square-shaped but may also be elongate-shaped or have, for instance a round or hexagonal shape. A rectangular shaped frame is probably most suitable for may applications. Although it may be convenient to provide the conduits 203 in "rows and columns" also a honeycomb arrangement or another form of "densely packing" the conduits 203 within the frame 100 is conceivable. An optimal arrangement will easily be found by a skilled person. Factors such as the strength of the frame and the likely pressure occurring in each conduit, has also the weight of the frame, play a rule in obtaining an optimised design for the frame. The conduits receive in use preferably each a plug in its entirety so there is no need to factor in a transverse size of a plug as sticking out of the conduits.

Figure 17:
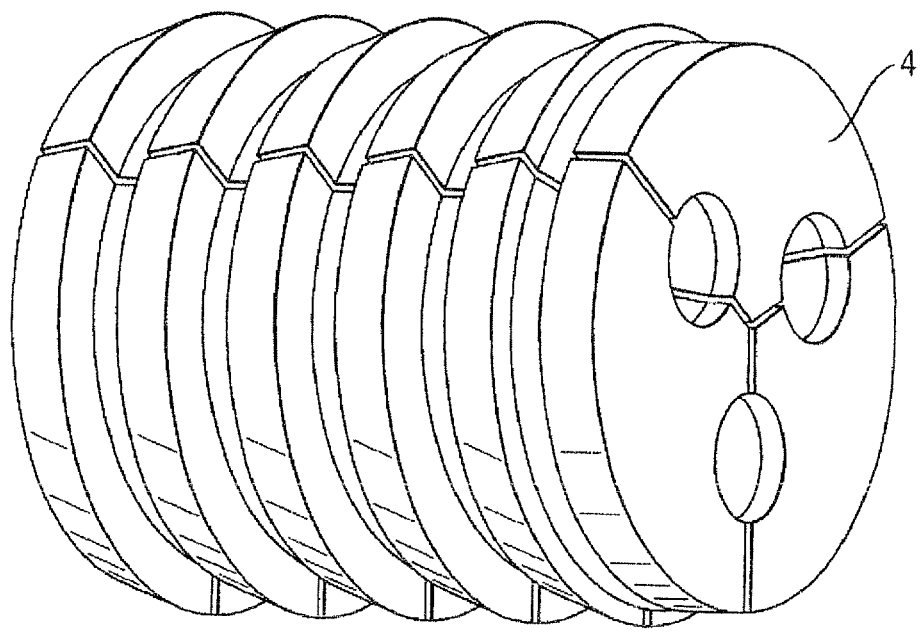
FIG. 17 shows schematically in perspective a part of an embodiment of a system according to the invention.
Figure 18:
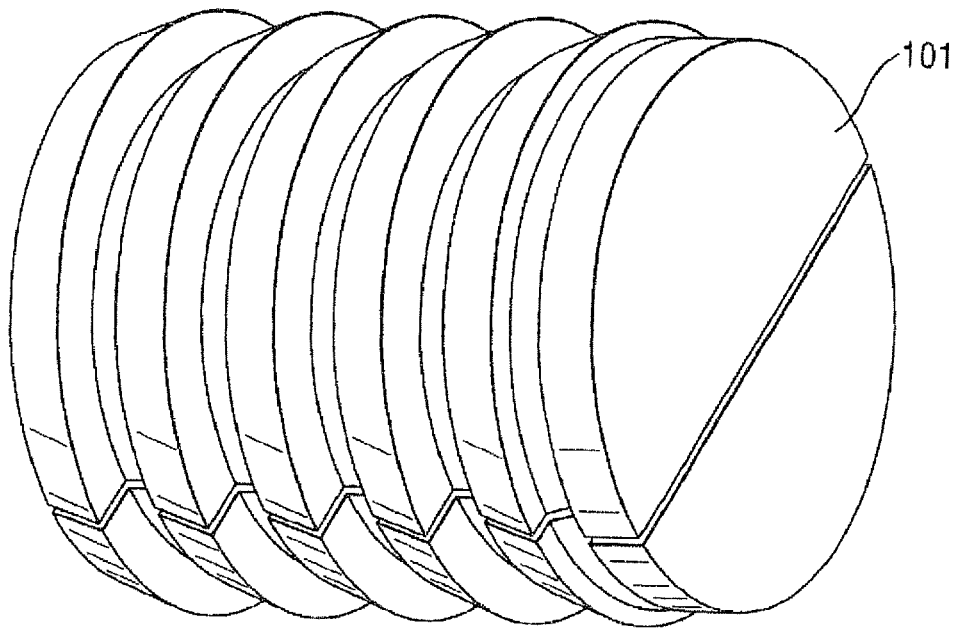
FIG. 18 shows schematically in perspective a part of an embodiment of a system according to the invention.

Although in FIGS. 12-16 all the frames are shown to have similarly sized conduits 203, it is possible that the conduits 203 have different sizes. It is even not necessary that all the conduits 203 are circular in cross-section, other cross-sectioned shapes are also possible. As shown in FIG. 16, the plugs 4 may be suitable for filling space 30 between the inner wall 10 of the conduits 203 and a number of pipes 2 which extend through such a conduit 203. An example of a three-part plug 4 is shown in FIG. 17.

It is not necessary that from the outset all the conduits 203 of a frame 100 have one or more pipes extending therethrough. It is possible that the frame 100 is large enough and comprises a relatively large number of conduits 203, and in fact more than straight away necessary when the frame 100 is installed. It is possible that some conduits 203 are provided with a so-called blind plug 101 for sealingly filling a conduit 203 which is at least temporarily free from having cables, pipes or ducts extending therethrough. When an extra cable needs to be inserted through the frame, or a cable needs to be removed, there is no need to dismantle the whole sealed transit. Such operations can be focussed on one or the few conduits 203 involved without disturbing the sealing in the other conduits.

Everything discussed for a system comprising one conduit 203, as shown in FIG. 1 and FIGS. 5-11, equally applies to a frame 100 having more than one conduit 203. So the blocking element 37 can be a separate part of the system and may be fixable to the frame 100. The blocking element may, for instance, be a plate made of a stiff material and provided with through recesses each having a diameter smaller than the diameter of the respective conduits 203 of the frame 100 to which the plate may be fixed. Fixing may, for instance, occur using screws and threaded holes provided in the frame 100 at predetermined positions.

Where the system comprises a frame 100 having more than one conduit 203, it may also apply that the system comprises additional blocking elements for hindering in each conduit 203 simultaneous and equal movement of both ends of the plug 4 relative to the conduit 203 in which that plug 4 is inserted. Usually and preferably that additional blocking element 37 will be fixable to the frame 100.

The system may comprise the elastically deformable plugs 4 as fittingly and sealingly insertable in one of the conduit sleeves 3. Preferably each of the conduits 203 has a length, as for instance indicated by the dashed arrow line 102 in FIG. 13, suitable for receiving a plug 4 in its entirety. As shown in FIGS. 9, 10, and 11 each conduit may have a length which is suitable for receiving two plugs 4 neighbouring each other in axial, say longitudinal, directions. This may equally apply to a frame 100 as discussed on the basis of the FIGS. 12-16.

It may also be the case that the frame 100 has a number of conduits 203 and that at least a part of the blocking element 37 is positioned in the respective conduits 203 such that on either side of the blocking element 37 each conduit 203 has a length which is suitable for receiving a plug in its entirety. If the conduit 203 is suitable for receiving a plug in its entirety, the proximal end of the plug may be flush with a front side of the frame 100. Suitable plugs 4 may be as described earlier on in the specification.

Ideally, all conduits 203 are identical. In that case the dimensions of the plugs 4 may, at least regarding their outer diameter, also be identical.

Finally, as mentioned before, the frame 100 may indeed be made of a metal, but may alternatively be made of a engineering plastic such as a hard plastic comprising polyetheremide (PEI) or, alternatively, polyethersulfonamide (PES). Such frames may be employable in, for instance, on-shore constructions and be placed in or onto openings in a concrete wall, with the aid of a suitable sealing kit, well-known in the art. Also an embodiment with the flange F may be of an engineering plastic. In that case the flange wall be made suitable by bolding the frame, preferably using a gasket, to the partitioning construction element.

From the description above it will be clear that the system according to the invention is free from a tightening element. The plugs can be positioned tighter upon increase of a pressure applied at one or both of the ends of the plug. However, it is envisaged that such a tightening occurs upon a pressure increased by the medium (such as a gas or fluid) which the plugs, and the system in general, should block, rather than a deliberately applied element for the mere purpose of tightening the plugs.

All such variations as discussed above are understood to fall within the scope of the invention as defined by the appended claims.

The invention claimed is:

1. A system for providing a sealed transit for a situation wherein one or a plurality of cables, pipes or ducts extend through the transit, wherein the system comprises a frame which is sealingly fixable onto an opening, wherein the frame comprises a plurality of conduits each having an enclosed inner circumferential wall, where the conduits are each suitable for receiving at least one of the plurality of cables, pipes or ducts and for receiving an elastically deformable plug for sealingly filling space between the enclosed inner circumferential wall of the conduit and the at least one of the plurality of cables, pipes or ducts, wherein the system further comprises at least one blocking element for hindering in each conduit movement of one end of a plug which is inserted in that conduit, the at least one blocking element comprising a number of substantially ring shaped elements, wherein the at least one blocking element is integrally connected to the frame, and wherein the frame and the at least one blocking element comprise together a single piece, wherein the frame is provided with a flange suitable for bolting the frame to a part of a partition that surrounds the opening and wherein the frame comprises a single piece, the single piece comprising the plurality of conduits each having the enclosed inner circumferential wall, where the conduits are each suitable for receiving at least one of the plurality of cables, pipes or ducts and for receiving an elastically deformable plug for sealingly filling space between the enclosed inner circumferential wall of the conduit and the at least one of the plurality of cables, pipes or ducts.

2. A system according to claim 1, wherein the frame is made of an engineering plastic.

3. A system according to claim 2, wherein the engineering plastic is polyetherimide (PEI) or polyethersulfonamide (PES).

4. A system according to claim 1, wherein all conduits are identical.

5. A system according to claim 1, wherein the system comprises at least one additional blocking element for hindering in each conduit simultaneous and equal movement of both ends of a plug relative to the conduit sleeve in which that plug is inserted.

6. A system according to claim 5 wherein one of the at least one additional blocking elements is fixable to the frame.

7. A system according to claim 1, wherein the system further comprises at least one elastically deformable plug which is fittingly and sealingly insertable in one of the conduits.

8. A system according to claim 1, wherein each of the conduits has a length which is suitable for receiving a plug in its entirety.

9. A system according to 8, wherein each conduit has a length which is suitable for receiving two plugs neighbouring each other in axial direction.

10. A system according to claim 9, wherein each conduit has a part of the at least one blocking element positioned in the conduit such that on either side of the blocking element the conduit has a length which is suitable for receiving a plug in its entirety.

11. A system according to claim 1, wherein the conduits are machined out of a single block of material.

12. A system according to claim 1, wherein towards one end of the block the conduits are narrower than at the other end of the block.

13. A system according to claim 1, wherein the at least one blocking element is provided by a decrease of diameter of the conduit(s).

14. A system according to claim 1, wherein the system is further provided with at least one blind plug for sealingly filling a conduit sleeve which is at least temporarily free from having cables, pipes or ducts extending therethrough.

* * * * *